United States Patent
Kreizel

Patent Number: 5,915,628
Date of Patent: Jun. 29, 1999

[54] WATERING CAN

[75] Inventor: James Kreizel, Hewlett, N.Y.

[73] Assignee: Dynamic Design, Inc., East Elmhurst, N.Y.

[21] Appl. No.: 08/858,276

[22] Filed: May 19, 1997

[51] Int. Cl.$^6$ ................................................. A01G 25/14
[52] U.S. Cl. ..................................... 239/377; 222/465.1
[58] Field of Search ........................... D23/212; 222/470, 222/471, 473, 475, 465.1; 239/374–379, 525, 526, 532; 42/94

[56] References Cited

U.S. PATENT DOCUMENTS

| | | |
|---|---|---|
| D. 38,545 | 5/1907 | Bamber . |
| D. 175,084 | 7/1955 | Locke . |
| D. 184,893 | 4/1959 | Reinecke . |
| D. 229,056 | 11/1973 | Grotz . |
| D. 240,129 | 6/1976 | Grotz . |
| D. 241,032 | 8/1976 | Burke et al. . |
| D. 266,018 | 8/1982 | Dilyard . |
| D. 266,450 | 10/1982 | Swett et al. . |
| D. 279,310 | 6/1985 | Murphy . |
| D. 357,729 | 4/1995 | Boyd ....................................... D23/212 |
| 1,522,172 | 1/1925 | Asbill ....................................... 239/374 |
| 1,932,125 | 8/1932 | Woodward . |
| 2,372,466 | 3/1945 | Zvolanek ........................... 239/377 X |
| 2,863,399 | 12/1958 | Heintz ............................... 222/470 X |
| 3,648,396 | 3/1972 | Smith ........................................... 42/94 |
| 3,648,933 | 3/1972 | Grotz ...................................... 239/377 |
| 3,918,582 | 11/1975 | Wallace . |
| 4,030,664 | 6/1977 | Tisbo et al. . |
| 4,392,594 | 7/1983 | Swett et al. .......................... 222/475 X |
| 4,843,749 | 7/1989 | Griffith ........................................ 42/72 |

FOREIGN PATENT DOCUMENTS

| | | |
|---|---|---|
| 716040 | 12/1931 | France . |
| 1375406 | 11/1963 | France . |
| 437666 | 11/1926 | Germany . |
| 2804844 | 8/1979 | Germany ............................... 239/526 |
| 94 15 464 U | 1/1995 | Germany . |
| 845467 | 8/1960 | United Kingdom . |

OTHER PUBLICATIONS

Handy Green II Hand–Held Spreader, The Scotts® Co., 1995.

*Primary Examiner*—Kevin Weldon
*Attorney, Agent, or Firm*—Dilworth & Barrese

[57] ABSTRACT

A watering can having ergonomic design features to support a wrist or an arm of a user while pouring water therefrom. The watering can comprises a reservoir defining an enclosure to contain a fluid therein, the reservoir including a closed bottom, an open top, and an opening on a forward facing side; a spout extending from the forward facing side which is in fluid communication with the reservoir and positioned to enclose the opening; a handle having an upper end extending from the open top and a lower end which extends from the closed bottom on a rearward facing side of the reservoir; and an extension member which projects rearward from the lower end of the handle to provide support to a wrist or an arm of a user.

11 Claims, 4 Drawing Sheets

WATERING CAN

BACKGROUND OF THE INVENTION

1. Field of the Invention

The present invention relates to watering cans, and more specifically to ergonomically designed watering cans.

2. Description of the Related Art

If there is one tool that symbolizes the small backyard or container garden, it's the watering can. Hoses and sprinklers are often used, but there is no comparison to the convenience and portability offered by a watering can—especially for the small backyard or indoor garden.

Watering cans have been known in the art for many years. Representative designs of previous watering cans are those disclosed, for example, in U.S. Pat. No. D 357,729 to Boyd, U.S. Pat. No. D 279,310 to Murphy, U.S. Pat. No. D 266,018 to Dilyard, U.S. Pat. No. D 184,893 to Reinecke. Each of these watering cans comprise fairly standard elements: a reservoir with a closed bottom and sides and an open top, a spout, and a handle. Improvements in the standard watering can design are disclosed in U.S. Pat. No. 4,030,664 to Tisbo et al. ("Tisbo") and U.S. Pat. No. 3,648,933 to Grotz ("Grotz"). Tisbo discloses a standard watering can which further comprises a sprayer adapted to deliver a water mist to the plant. Grotz discloses a watering can having two spouts connected by a circular handle. One spout is open while the other is combined with a rosette spray head.

Watering cans are available in a wide variety of sizes to meet the needs of each individual gardener. Typically, the volume of water contained in a watering can will vary between one-quarter of a gallon, for small house plants, up to five gallons for use in a backyard garden. The weight of a water-filled watering can will therefore vary between approximately two and forty pounds. Such an amount often turns the otherwise pleasurable task of watering one's plants into a discomforting and cumbersome chore. Due to the distance of the handle from the center of gravity of the watering can with the contained water, a moment force is created about the wrist or forearm of a user which makes it difficult and uncomfortable, if not impossible, for the gardener to properly water the intended plant. Without the proper support to counteract the moment force, the gardener's wrist and arm is often not strong enough to support the liquid-filled watering can.

Accordingly, a need exists for an improved watering can which provides a means for supporting the wrist or arm of a user when pouring the water.

SUMMARY OF THE INVENTION

The presently disclosed watering can overcomes the above-noted and other disadvantages of prior watering cans. In particular the present disclosure provides a watering can which includes a reservoir defining an enclosure to contain a fluid therein, the reservoir including a closed bottom, an open top, and an opening on a forward facing side; a spout extending from the forward facing side which is in fluid communication with the reservoir and positioned to enclose the opening; a handle having an upper end extending from the open top and a lower end which extends from the closed bottom on a rearward facing side of the reservoir; and an extension member which projects rearward from the lower end of the handle to provide support to a wrist or an arm of a user.

It is a further object of the present disclosure to provide an ergonomically designed watering can which includes a means for supporting a wrist or arm of a user. The ergonomic design allows users to water plants with greater comfort and ease.

These and other objects, features and advantages of the present disclosure will become apparent from the following detailed description of illustrative embodiments, which is to be read in connection with the accompanying drawings.

BRIEF DESCRIPTION OF THE DRAWINGS

For a better understanding of the presently disclosed watering can, reference is made to the following description of an exemplary embodiment thereof, and to the accompanying drawings, wherein.

DETAILED DESCRIPTION OF THE PREFERRED EMBODIMENTS

Figure 1:
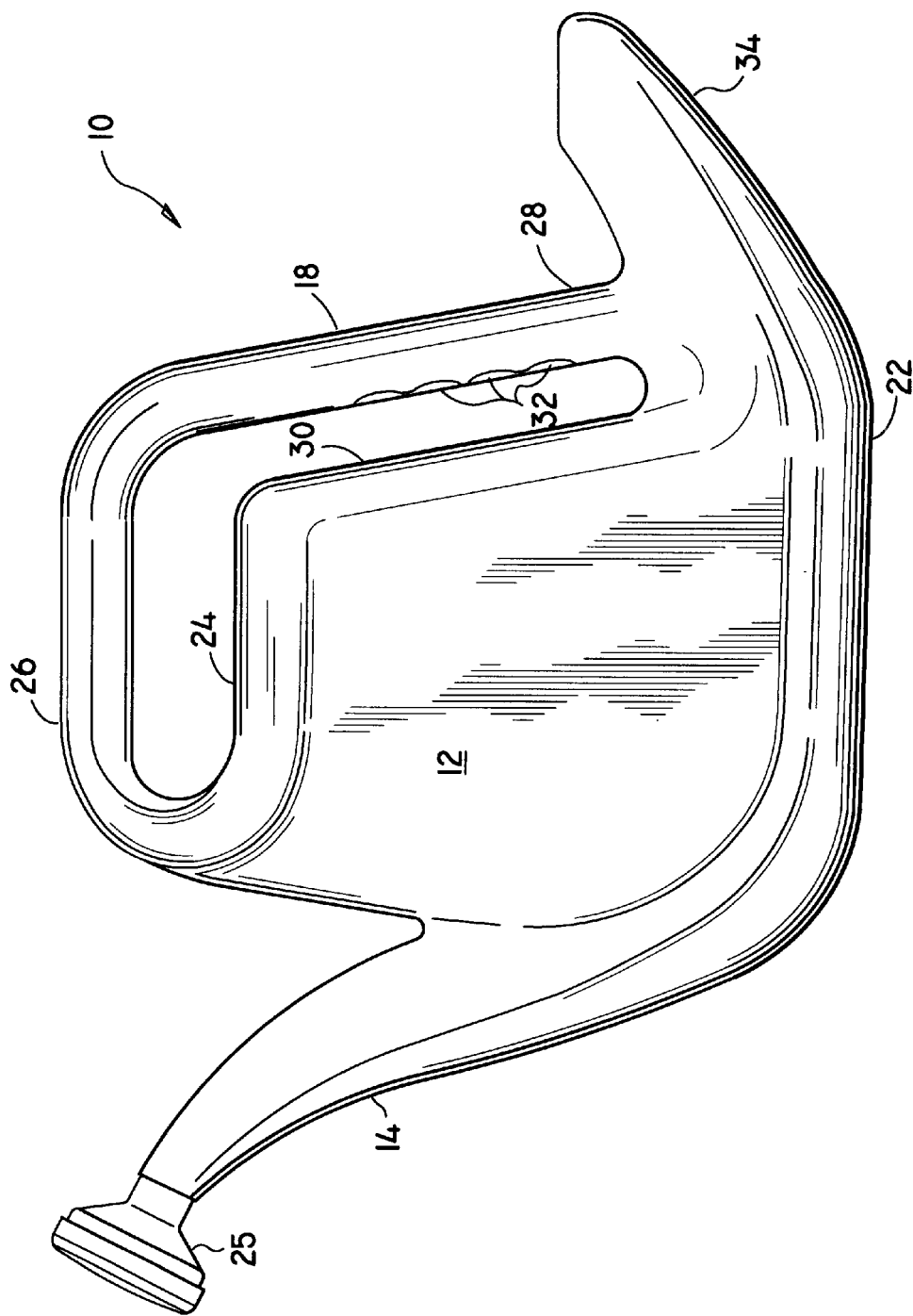
FIG. 1 is a side view of a watering can constructed in accordance with the present disclosure.

Referring now to the drawings in detail, and initially to FIG. 1, a watering can, generally indicated by numeral 10, is shown therein. Watering can 10 includes a reservoir 12, and a spout 14 extending from a forward facing side 16 of reservoir 12. A handle 18 is mounted on reservoir 12 and an extension member 34 is mounted adjacent a rearward facing side 20 of reservoir 12. Watering can 10 may be formed of a material selected from the group consisting of aluminum, plastic and steel, and is preferably formed of a durable lightweight plastic. Watering can 10 may be manufactured as a single integral unit or in a variety of pieces and joined by methods as are known in the art.

Reservoir 12 includes a closed bottom 22 and an open top 24. Reservoir 12 also includes an opening in forward facing side 16 which is in fluid communication with spout 14. Reservoir 12 may be formed to various dimensions and shapes which are designed to contain a volume of liquid in the range of about one-quarter gallon to about five gallons.

Spout 14 is a hollow member extending upward and outward from the forward facing side 16. Spout 14 extends from a lower portion of forward facing side 16 in a position to enclose the opening therein. Liquid will thus flow from the reservoir 12 through the opening and through the spout 14 when watering can 10 is tilted in a forward direction. Spout 14 is shown terminating in a rosette nozzle head 25. It is contemplated that spout 14 may also be unrestricted to dispense a solid stream of liquid.

Handle 18 has an upper end 26 extending from the open top 24, and a lower end 28 extending from the closed bottom 22 on a rearward facing side 30 of reservoir 12. In a preferred embodiment, handle 18 is substantially L-shaped. Handle 18 also preferably has a plurality of knurled indentations 32 therein, for engaging fingers of a user's hand.

Extension member 34 extends from the lower end 28 of handle 18 and rearward facing side, and projects rearward therefrom. Extension member 34 is advantageously provided to support a wrist or an arm of a user while watering can 10 is tilted in a fashion to dispense water from the spout. Handle 18 and extension member 34 may be hollow and are preferably in fluid communication with each other and with an opening in the lower portion of rearward facing side 30. Extension member 34 provides additional stability to watering can 10 when it is filled with water or other liquid.

When a user grasps handle 18, with the fingers of the hand engaging indentations 32, extension member 34 is positioned to support the wrist or arm of the user. During a pouring motion, leverage and support is therefore provided to counteract a moment force about the wrist or arm of a user. Due to the distance of the handle from the center of gravity of the watering can with the contained water, a moment force is created about the wrist or forearm of a user which makes it difficult and uncomfortable, if not impossible, for the gardener to properly water the intended plant. Thus, the extension member enables the user to perform the watering function with significantly greater comfort and ease.

Figure 2:
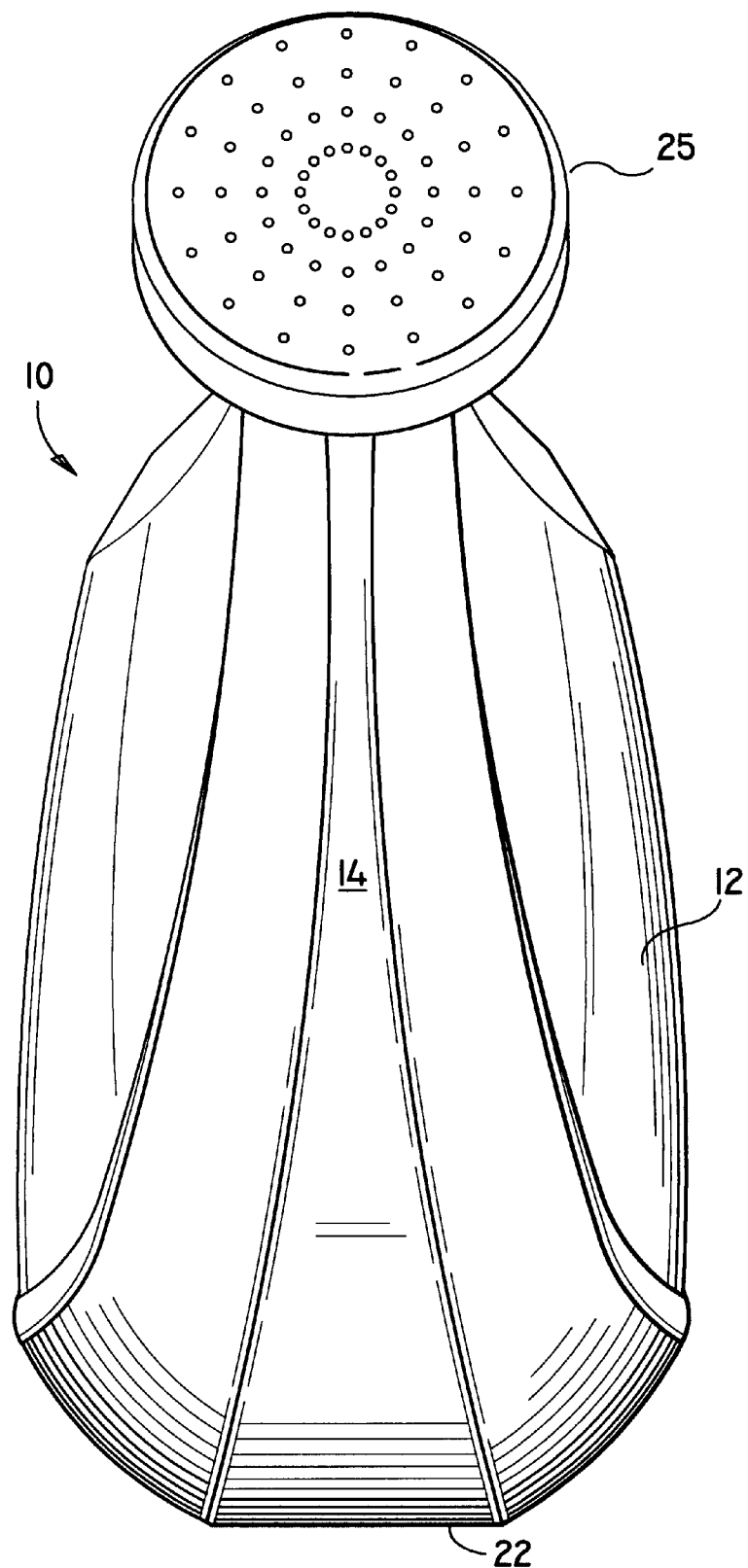
FIG. 2 is a side view of the watering can of FIG. 1.

Referring to FIG. 2, closed bottom 22 of reservoir 12 has a substantially horizontal flat surface for maintaining watering can in an upright position when set down. Spout 14 is shown extending upward from bottom 22. Spout 14 tapers down as it extends toward rosette nozzle head 25. Rosette nozzle heads typically have a plurality of orifices which permits the flow of water as a broad spray. The water escapes from this spray nozzle as a gentle spray for application directly to the foliage as well as the roots of a plant. As described above, spout 14 may also be unrestricted to dispense a solid stream of liquid.

Figure 3:
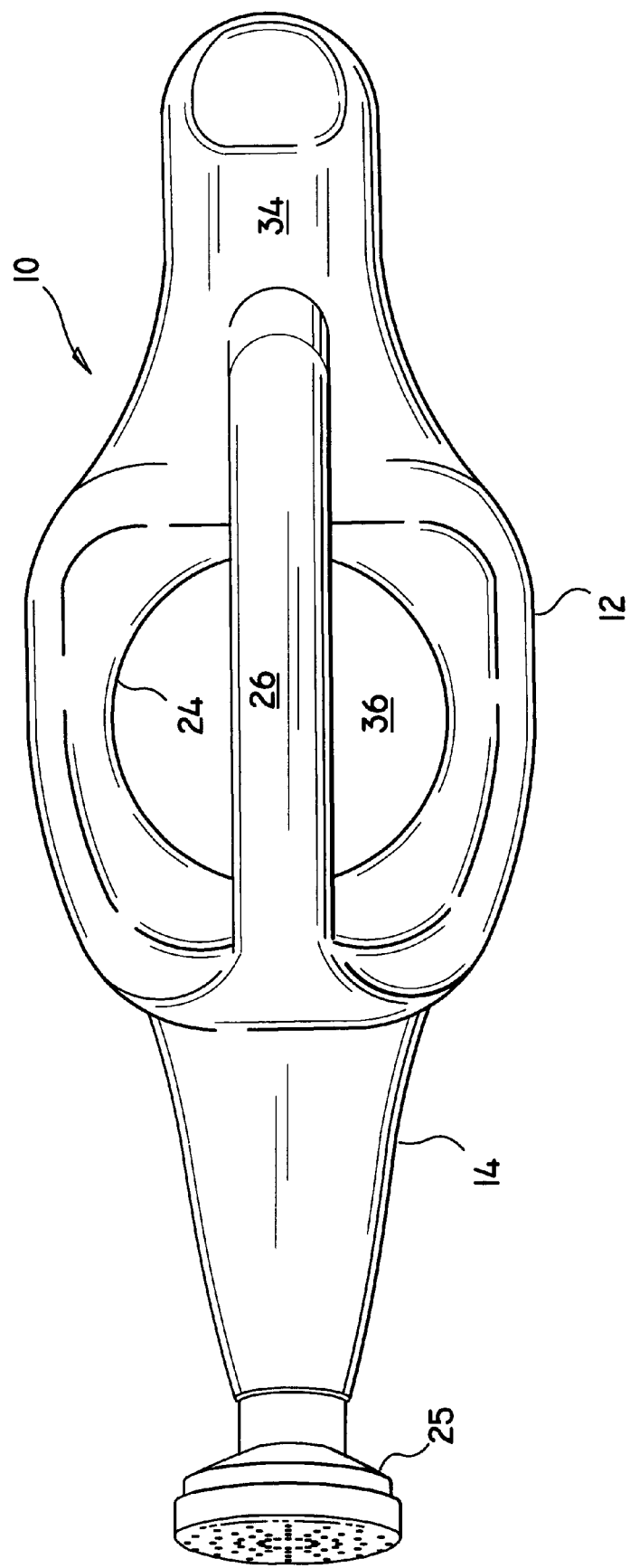
FIG. 3 is a top view of the watering can of FIG. 1.

In FIG. 3, handle 26 is shown extending over open top 24 and connecting to a forward edge thereof. Spout 14 projects outward and tapers down as it extends toward nozzle head 25. The top view shows the substantially rectangular shape of extension member 34 as it projects rearward from reservoir 12. However, it is within the scope of the present disclosure that extension member 34 may be formed in any geometry suitable for biasing against the wrist or forearm of the user. The open top 24 defines a circular opening 36. Opening 36 is provided to allow the user to fill the reservoir 12 with liquid. Also, reservoir 12 is shown having a substantially elliptical cross-sectional shape. It is contemplated that the shape of the reservoir may also be circular, rectangular or a variety of other shapes.

Figure 4:
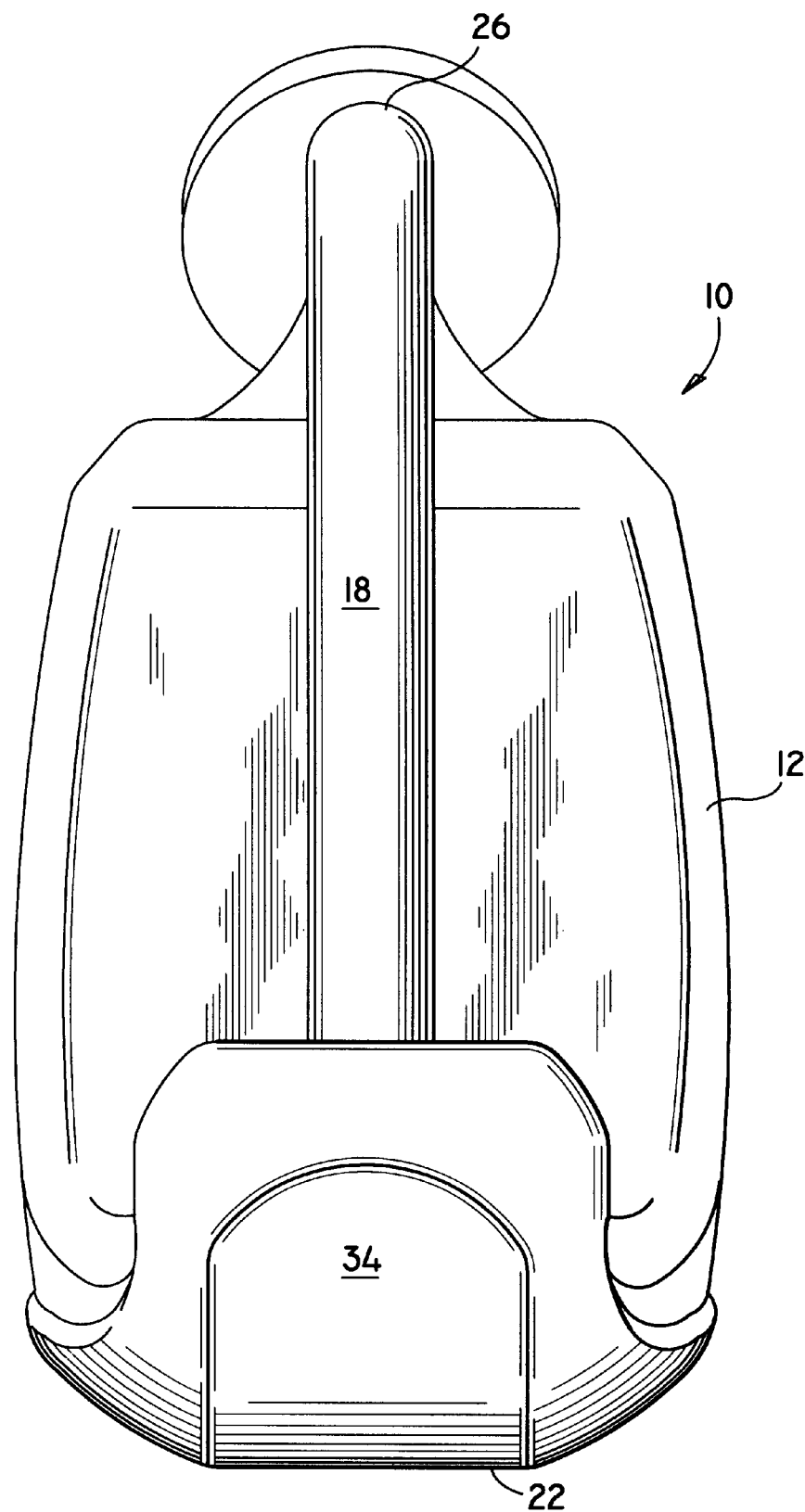
FIG. 4 is a side view of a rearward facing side of the watering can of FIG. 1.

As shown in FIG. 4, extension member 34 extends upward from closed bottom 22. This facilitates extension member 34 making contact with the wrist or forearm of the user at a position at approximately the same height of the center of gravity of the watering can to facilitate optimum balance when watering can 10 is held properly by the user.

Although the illustrative embodiment of the presently disclosed watering can has bees described herein with reference to the accompanying drawings, it is to be understood that the invention is not limited to this precise embodiment, and that various other changes and modifications may be affected therein by one skilled in the art without departing from the scope or spirit of the invention. All such changes and modifications are intended to be included within the scope of the invention as defined by the appended claims.

What is claimed is:

1. A watering can comprising:
   a reservoir defining an enclosure to contain a fluid therein, the reservoir including a closed bottom, an open top, and an opening on a forward facing side;
   a spout extending from the forward facing side in fluid communication with the reservoir;
   a handle having an upper end extending from the open top and a lower end, the lower end extends from the closed bottom on a rearward facing side of the reservoir; and
   a rigid extension member projecting from the rearward facing side of the reservoir and positioned adjacent to the lower end of the handle, the rigid extension member being configured and dimensioned such that upon grasping of the handle by a user at a position adjacent the extension member, the rigid extension member biases against at least a portion of the user's arm and defines a lumen in fluid communication with the reservoir.

2. A watering can as recited in claim 1, wherein the watering can is formed of a material selected from the group consisting of aluminum, plastic and steel.

3. A watering can as recited in claim 1, wherein the handle is substantially L-shaped.

4. A watering can as recited in claim 1, herein the handle has a plurality of indentations for engagement with fingers of a user's hand.

5. A watering can comprising:
   a reservoir defining an enclosure to contain a fluid therein, the reservoir including a closed bottom and an open top;
   a spout extending from forward facing side in fluid communication with the reservoir;
   a handle having an upper end extending from the open top and a lower end, the lower end mounted adjacent the closed bottom on a rearward facing side of the substantially cylindrical reservoir; and
   means for supporting at least a portion of a user's arm, the supporting means extending from the handle and defining a lumen in fluid communication with the reservoir.

6. A watering can as recited in claim 5, wherein the means for supporting at least a portion of a user's arm is defined by a rearwardly projecting extension member.

7. A watering can as recited in claim 5, wherein the watering can is formed of a material selected from the group consisting of aluminum, plastic and steel.

8. A watering can as recited in claim 5, wherein the handle has a plurality of indentations for engagement with fingers of user's hand.

9. A watering can as recited in claim 5, wherein the handle is substantially L-shaped.

10. A watering can as recited in claim 5, wherein the means for supporting at least a portion of the user's arm is positioned adjacent the lower end of the handle.

11. An ergonomic watering can comprising:
    a reservoir defining an enclosure to contain a fluid therein, the reservoir including a closed bottom, an open top, and an opening on a forward facing side;
    a spout extending from the forward facing side in fluid communication with the reservoir;
    a handle having an upper end extending from the open top and a lower end, the lower end extends from the closed bottom on a rearward facing side of the reservoir; and
    a rigid extension member projecting from the rearward facing side of the reservoir and positioned adjacent to the lower end of the handle, the rigid extension member terminating laterally away from the reservoir at a location below the open top of the reservoir, the extension member defining a lumen in fluid communication with the reservoir and being configured and dimensioned such that upon grasping of the handle by a user, the extension member biases against a portion of the user's arm.

* * * * *